United States Patent
Holloway, Jr.

[11] Patent Number: 5,964,179
[45] Date of Patent: Oct. 12, 1999

[54] METHOD FOR INDICATING THE EXTENT OF LAND SUBJECTED TO AN AGRICULTURAL OPERATION

[76] Inventor: Thomas E. Holloway, Jr., 2916 W. Kerm Rd., Marion, Ind. 46952

[21] Appl. No.: 08/971,237

[22] Filed: Nov. 15, 1997

[51] Int. Cl.[6] ................. F21K 2/00; G08B 5/00
[52] U.S. Cl. ............. 116/201; 116/209; 116/211
[58] Field of Search .................. 116/201, 209, 116/211; 362/34

[56] References Cited

U.S. PATENT DOCUMENTS

| | | |
|---|---|---|
| 2,199,421 | 5/1940 | Stevens, Jr. . |
| 3,019,470 | 2/1962 | Romeo . |
| 3,029,470 | 4/1962 | Frank . |
| 3,072,200 | 1/1963 | Yerkes . |
| 3,198,383 | 8/1965 | Brown . |
| 3,443,727 | 5/1969 | Wellford, Jr. . |
| 3,470,846 | 10/1969 | Tillay et al. . |
| 3,481,545 | 12/1969 | Cooke et al. . |
| 3,524,508 | 8/1970 | West . |
| 3,531,024 | 9/1970 | Rosselot . |
| 3,669,891 | 6/1972 | Greenwood et al. ............. 252/90 |
| 3,766,987 | 10/1973 | Orthman . |
| 3,903,970 | 9/1975 | Grataloup . |
| 4,011,914 | 3/1977 | Elmer . |
| 4,273,264 | 6/1981 | Legg ............................. 222/162 |
| 4,296,875 | 10/1981 | Borglum . |
| 4,316,554 | 2/1982 | Lloyd . |
| 4,635,847 | 1/1987 | Jackson . |
| 5,007,368 | 4/1991 | Bush ............................. 116/211 |
| 5,338,129 | 8/1994 | Oden . |
| 5,427,708 | 6/1995 | Stark ............................. 252/108 |
| 5,734,167 | 3/1998 | Skelly ........................... 250/458.1 |

Primary Examiner—Hezron Williams
Assistant Examiner—Willie Morris Worth
Attorney, Agent, or Firm—Ference & Associates

[57] ABSTRACT

There is provided a method for marking the treated areas of soil or ground surface wherein the boundary markers have a high degree of visibility, thereby permitting the boundary markers to be distinguishable from a distance and in less than ideal lighting conditions. The marking medium used in the boundary marker utilizes chemiluminescence to radiate light. The chemiluminescence may also be controlled to regulate the length of time marking medium radiates light. When the marking medium is applied to the ground to mark the boundary of the treated area in accordance with the present invention, the marker is easily distinguishable from a distance and may be easily viewed in less than ideal lighting conditions.

3 Claims, 3 Drawing Sheets

FIG. 1

S1   ADD CHEMILUMINESCENCE TO MARKING MEDIUM

S2   ACTIVATE CHEMILUMINESCENCE

S3   APPLY TREATMENT AND DISPENSE MARKING MEDIUM

METHOD FOR INDICATING THE EXTENT OF LAND SUBJECTED TO AN AGRICULTURAL OPERATION

The present invention relates to method for indicating the extent of land subjected to an agricultural operation utilizing a chemiluminescent marker medium to indicate an edge of a ground surface area being treated.

BACKGROUND OF THE INVENTION

With the advent of large scale farming on tracts of land measured in thousand of acres instead of tens of acres, and the development of farm machinery of massive size to handle such acreage, problems arose which were either non-existant or much more simply overcome by the small farm farmer. For example, in making a single pass of a colorless pesticide spray or fertilizer spray, the small farm farmer usually had no difficulty in determining the dividing line between the sprayed portion and the unsprayed portion and could therefore direct his equipment without much difficulty. However, with large scale machinery where a single pass may be as much as from 50 to 70 feet in width, it becomes a very serious problem to determine where to make the next pass. Too much pesticide or fertilizer or too little of either can cause severe damage to a crop, particularly, if the area of either overlap or skipping is of an order of magnitude of ten feet over a distance of 1 or 2 miles. Too much pesticide, i.e., a double dose for such a width can kill from one to three acres of crop through overdose or permit the crop to fail in an equivalent area because of failure to apply any dose whatever.

Liquid used for soil treatment in applications of fertilizers, herbicides, pesticides and other soil treatments is often applied to the ground surface by spraying from an elongated boom moved over the field surface behind a tractor. The liquid is fed to the boom from a container either carried on the spraying device or otherwise attached to the tractor. The boom is typically mounted in a transverse orientation to the direction of movement to the tractor in order to produce a wide application pattern. The overall length of the boom enables application of the liquid in a minimum number of passes or swaths across the field. The difficulty, however, is in knowing exactly where the boundary of the previous liquid application swath lies since it is desirable to avoid overlapping applied liquid, or leaving areas or gaps of ground surface untreated.

Various forms of marking devices have been developed as suggested solutions to this problem. These marking devices include ones which physically mark the ground by means of a cutting disk, as disclosed by U.S. Pat. Nos. 3,903,970, 3,072,200, 3,766,987, and 3,524,508; use liquid marking mediums dispensed by the treatment apparatus, as disclosed in U.S. Pat. Nos. 2,199,421, and 3,019,470; use powdered marking mediums, as disclosed by U.S. Pat Nos. 3,198,383, 3,443,727, and 3,531,024; and use a foam marking medium, as disclosed by U.S. Pat. No. 3,481,545.

Of the above references, none provide a simple yet adequate solution to the problem of marking the boundaries of treated soil or ground surface. Devices which physically mark the ground surface by means of cutting disk are not feasible in previously planted fields since the marking device will destroy a portion of the crop. Devices applying liquid markers often employ dyes, paint, or other materials that are not easily distinguishable from a distance; often such materials are harmful to the soil and not readily available to the user. Powder markers have the drawback of potential permanence; for example, a lime deposit used as a marker will remain on the ground surface until plowed under and this could cause confusion if subsequent applications of liquid need be applied as the previous markers could be confused with present markers. While foam markers overcome some of the disadvantages of these marking devices, all of the marking devices share the limitation that their markers are not easily distinguishable from a distance or in less than ideal lighting conditions, including dusk and darkness.

SUMMARY OF THE INVENTION

In accordance with the present invention, there is provided a method for marking the treated areas of soil or ground surface wherein the boundary markers have a high degree of visibility, thereby permitting the boundary markers to be distinguishable from a distance and in less than ideal lighting conditions. According to the present invention, it is provided that the marking medium used in the boundary marker utilizes chemiluminescence to radiate light. The chemiluminescence may also be controlled to regulate the length of time marking medium radiates light. When the marking medium is applied to the ground to mark the boundary of the treated area in accordance with the present invention, the marker is easily distinguishable from a distance and may be easily viewed in less than ideal lighting conditions, which permits the hours of application of the ground treatment to be extended without sacrificing the placement of the treatment needed and previously unobtainable in such conditions.

BRIEF DESCRIPTION OF THE SEVERAL VIEWS OF THE DRAWINGS

FIG. 1 is a flow chart of the method according to the invention.

DETAILED DESCRIPTION OF THE INVENTION

Referring to FIG. 1, a flow chart is shown which sets forth the method of the present invention. In accordance with this method, a chemiluminescent element is added to the marking medium (S1). The chemiluminescent element is then activated (S2), and then the treatment is applied to the ground area to be treated while the marking medium is dispensed to mark the boundary of the treated area (S3).

Figure 2:
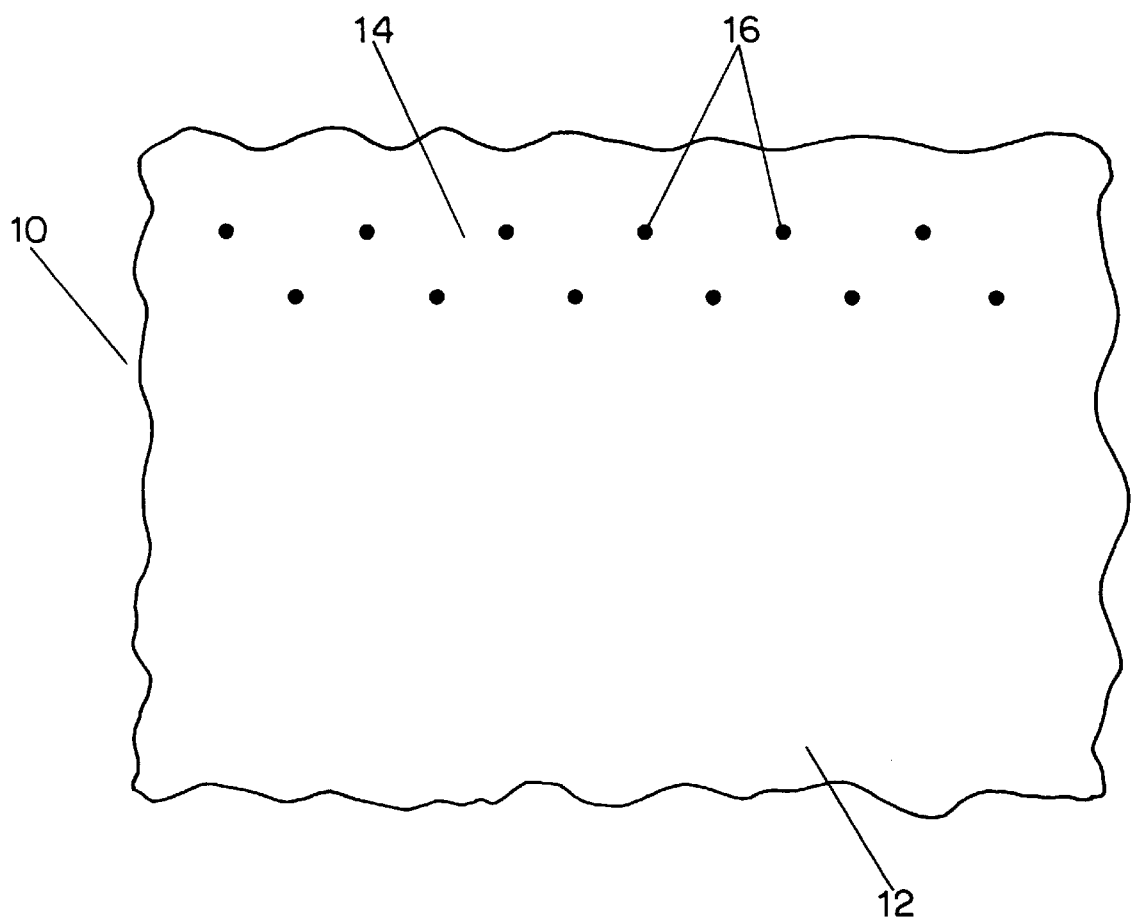
FIG. 2 is a depiction of an area of land treated in accordance with the present invention.

Referring now to FIG. 2, an area of treated ground is shown marked in accordance with the present invention, and includes the ground to be treated 10, the ground which has not yet been treated 12, the ground which has been treated 14, and markers 16 delimiting the treated area in accordance with the present invention.

Figure 3:
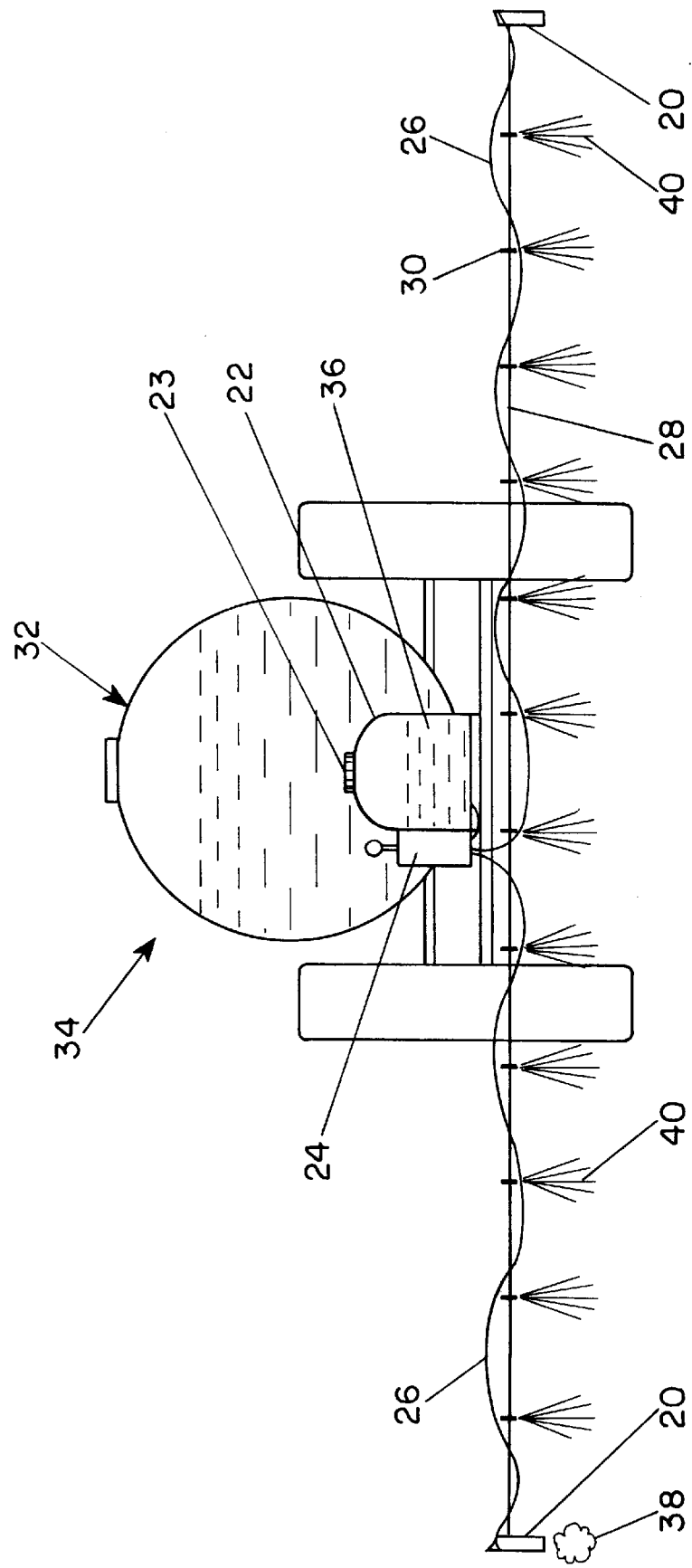
FIG. 3 is a plan view of an apparatus which may be used in accordance with the method of the present invention.

Referring to now to FIG. 3, the preferred apparatus for applying the marker medium of the present invention is shown. The apparatus may be mounted on a trailer attached to a field car or a tractor, and consists of discharge orifices 20 mounted, in the example shown in FIG. 3, above the ground at each lateral extremity of a sprayer boom 28 carried by a trailer 34. Mounted at a convenient point on the trailer is a closed reservoir 22, typically having a 12 gallon capacity and having fill lid 23, containing a detergent solution 36 or other agriculturally unobjectionable foamable liquid. Reservoir 22 is connected to discharge orifices 20 by means of a delivery hose 26, which is preferably a ½" or ¾" in diameter rubber or nylon hose.

Control box 24 includes controls (not shown) to select the left and/or right orifice, an air pump (not shown) for delivering detergent solution 36 or other agriculturally unobjectionable foamable liquid to orifices 20, and means (not shown) for adjusting the air pressure. The air pump is preferably an electric one, however, other powers means may be used. The controls for orifice selection and air pressure adjustment means are typically located in control box 24 and also operative connected to the operator's location so adjustments may be made without the need to bring the apparatus to a stop. Orifices 20 may be capped with a nozzle or wick to assist with distribution of the marker medium 38, depending on operator selection. Typically, a nozzle or wick is used when traversing bear ground, as the marker medium builds up and drops off, falling to the ground, where it is difficult to see if crops are present.

Also mounted on sprayer boom 28 are sprayer nozzles 30, which are used to dispense the treatment 40 to be applied to the ground traversed by the apparatus. The treatment is carried on trailer 34 in solution tank 32 and its distribution to sprayer nozzles 30 is accomplished and controlled by conventional means known in the art. Typically solution tank 32 is a 500 gallon tank made from polyolefin.

In this apparatus, the detergent 9 or other agriculturally unobjectionable foamable liquid is preferably Dura Foam 160 Foam Marking Concentrate from RHS, Inc. in Hiawatha, Kans. The chemiluminescent material to be added to the detergent or other agriculturally unobjectionable foamable liquid is preferably obtained from lightsticks manufactured by the Omniglow Corporation of Novato, Calif. According to literature made available by the Omniglow Corporation, the lightsticks contain a small capsule inside the lightstick which is filled with hydrogen peroxide (which is commonly used to disinfect cuts or bleach hair). The plastic tube of the lightstick is filled with a liquid called ester. These two liquids are kept separate by the glass capsule or ampule. When the ampule is broken by bending the plastic tube, the hydrogen peroxide comes into contact with the ester.

To obtain useful quantities of the chemlumenescent materials, the lightsticks are cut open and the ester collected along with the glass ampule. The ampules are broken and the liquid is separately collected for later use in activating the chemlumenescent reaction. For a twelve gallon tank, approximately twenty lightsticks are used. While the use of lightsticks is described to obtain the necessary chemlumenescent materials, it should be understood that these materials may be obtained by other means, including the appropriate raw chemicals themselves.

The number of lightsticks (or quantities of chemicals obtained thereby) can be varied to obtain different results, for example, more lightsticks may be used to create a brighter light. Similarly, the temperature of the solution can be regulated to control the chemlumenescent qualities of the foamable liquid. For example, Omniglow products give maximum light emission when used at temperatures ranging from 60° F.–80° F. If temperature is higher than 80° F., the light will be brighter, but will last for a shorter duration. If the temperature is lower than 60° F., the light will be less bright, but will last longer. As temperature decreases, intensity decreases and duration of light output increases.

To ready the apparatus for marking, closed reservoir 22 is filled to the appropriate point with water, foamable liquid 9 is added, and the chemlumenescent material obtained from the lightsticks is added. Preferably, the chemlumenescent material obtained from the lightsticks has been premixed with the foamable liquid 9. Once these materials have been placed in closed reservoir 22, the materials previously collected from the ampules is added to activate the chemlumenescent reaction in the foamable liquid. Such activation preferably occurs shortly after the chemlumenescent material is added, such as at the location where reservoir 22 is filled, although activation may occur at a later point in time and in another location.

Whilst in the embodiment described, two discharge orifices 20 are provided, and the controls enables foam to be supplied to either one or both, it may in some cases be possible to use only one orifice and to dispense with the control. Moreover, it may be convenient to indicate some other line parallel to the direction of motion of the vehicle other than a boundary of a bout, in order to facilitate alignment of the vehicle during a subsequent bout and if do the discharge orifice or orifices may be located accordingly.

It may be found that the clear indication given of the extent of land treated by an agricultural operation by means of the present invention will enable productivity to still be further increased in that it may enable wider bouts to be treated at one time since there is now no difficulty in determining the boundary of such bouts. Moreover, the amount of liquid used for foam production is relatively small, and consequently it is found that a reservoir with an effective capacity of for example 12 gallons capacity will normally be sufficient for several hours operation without refilling: it should be noted that when filling the reservoir space must be left for foam formation.

It should be understood that while the method of the present invention has been described with respect to use by preferred foam dispensing apparatus, the method may be used with other apparatuses. For example, any apparatus dispensing a liquid marking medium, or a powdered marking medium. Further, the method of the present invention may also be used in connection with aerial streamer markers where the ground treatment as been applied by aircraft, as disclosed in U.S. Pat Nos. 3,470,846 and 4,316,554.

While there have been described what are believed to be the preferred embodiments of the invention, those skilled in the art will recognize that other and further modifications may be made thereto without departing from the invention and it is intended to claim all such changes and modifications as fully within the scope of the invention.

I claim:

1. A method of marking the boundary of an area of treated ground in less than ideal lighting conditions, comprising the steps of:

adding chemiluminescent material to a marking medium;

activating said chemiluminescent material to produce chemiluminescence in said marking medium;

applying a treatment to an area of earth; and dispensing said marking medium to indicate the area of ground which has been treated.

2. The method of claim 1, wherein said dispensing of said marking medium occurs through the use of a liquid marking medium.

3. The method of claim 1, wherein said dispensing of said marking medium occurs through the use of a foam marking medium.

* * * * *